United States Patent [19]

Conaway et al.

[11] Patent Number: 5,253,853
[45] Date of Patent: Oct. 19, 1993

[54] VIBRATION DAMPENING DEVICE

[75] Inventors: Richard Conaway, Shelby, Ohio; Thomas A. McKenzie, Spring Lake, Mich.

[73] Assignee: Applied Power Inc., Butler, Wis.

[21] Appl. No.: 944,917

[22] Filed: Sep. 15, 1992

[51] Int. Cl.⁵ .............................. B60G 11/26
[52] U.S. Cl. ............................. 267/256; 267/131; 267/64.16; 180/89.15; 248/564
[58] Field of Search .............. 267/131, 217, 218, 256, 267/64.16, 64.27, 64.28, 64.25, DIG. 1, DIG. 2, 113, 118, 117; 188/299, 266; 180/89.12, 89.13, 89.14, 89.15, 89.16; 296/190; 248/564, 585, 586, 588, 589

[56] References Cited

U.S. PATENT DOCUMENTS

| | | | |
|---|---|---|---|
| 2,885,217 | 5/1959 | Fellabaum | 267/217 X |
| 3,797,883 | 3/1974 | Steiner et al. | 180/89.14 |
| 3,944,017 | 3/1976 | Foster | 180/89.14 |
| 3,948,341 | 4/1976 | Foster | 180/89.15 |
| 3,966,009 | 6/1976 | Meacock, II et al. | 180/89 A |
| 4,074,886 | 2/1978 | Yates | 248/588 X |
| 4,093,197 | 6/1978 | Carter et al. | 267/131 |
| 4,213,631 | 7/1980 | Wilkerson | 280/668 X |
| 4,265,328 | 5/1981 | Rowa et al. | 180/89.13 |
| 4,275,918 | 6/1981 | Franco | 296/190 |
| 4,452,329 | 6/1984 | Stone et al. | 180/89.15 |
| 4,488,613 | 12/1984 | Marjoram | 180/89.15 |
| 4,513,845 | 4/1985 | Stephens et al. | 188/299 |
| 4,650,208 | 3/1987 | Mason | 280/661 |
| 4,735,272 | 4/1988 | Sjöström et al. | 180/89.14 |
| 4,807,713 | 2/1989 | Smith et al. | 180/89.14 |
| 4,854,603 | 8/1989 | Scaduto | 280/661 |
| 4,871,189 | 10/1989 | Van Breeman | 180/89.12 |
| 4,989,684 | 2/1991 | Conaway | 180/89.15 |
| 5,109,939 | 5/1992 | Conaway et al. | 180/89.15 |

FOREIGN PATENT DOCUMENTS

| | | | |
|---|---|---|---|
| 1264345 | 1/1990 | Canada | |
| 1806380 | 7/1970 | Fed. Rep. of Germany | 248/564 |
| 1916403 | 10/1970 | Fed. Rep. of Germany | 267/131 |
| 2304950 | 8/1973 | Fed. Rep. of Germany | 248/564 |
| 2485995 | 1/1992 | France | 267/131 |
| 0120351 | 9/1979 | Japan | 267/64.16 |
| 930903 | 7/1963 | United Kingdom | 248/564 |
| 2027650 | 2/1980 | United Kingdom | |

Primary Examiner—Robert J. Oberleitner
Assistant Examiner—Peter M. Poon
Attorney, Agent, or Firm—Quarles & Brady

[57] ABSTRACT

A vibration dampening suspension device for isolating a truck cab from the force vibrations of a vehicle frame, which includes an impact plate mounted to the truck cab, and a support plate mounted to the vehicle suspension. The device further includes a link member pivotally interconnected at one end with the support plate at a support pivot, and a lever member with a first end pivotally interconnected with the impact plate at a main pivot. The link member is pivotally interconnected with the lever member for rotation of the lever member with respect to the main pivot during compression of the shock absorber when the supporting body, suspended body and device are in a dynamic condition. A hydraulic shock absorber is provided with a first end pivotally interconnected with the lever member second end at a shock pivot and the second end pivotally interconnected with the impact plate at a pivot spaced from the main pivot. An air spring interconnected between the impact and support plates, and a torque arm pivotally interconnected between the impact plate and support plate, are also included.

19 Claims, 6 Drawing Sheets

VIBRATION DAMPENING DEVICE

TECHNICAL FIELD

The present invention relates to a combination dampening device, and more particularly to an improved vibration dampening suspension device for a vehicle.

BACKGROUND OF THE INVENTION

To provide comfort for truck drivers and reduce driving fatigue experienced by operators of truck vehicles, it is desirable to suspend the operator's cab by utilizing vibration dampening and shock absorption device intermediate the truck chassis and cab which reduces the shock, vibration and consequent pounding the driver experiences during the operation of the vehicle. Additionally, the continued application of vibration and shock forces to the cab results in structural damage which ultimately results in increased maintenance cost.

The load carried by a truck vehicle is supported by the frame which is resiliently carried by suspension springs and supported by the truck wheels. Suspension springs have a high rate of stiffness which makes the ride more jarring on the operator of the vehicle. To dampen the vibration and shock transmitted to the cab, suspension systems have been employed utilizing conventional hydraulic automotive shock absorbers and air springs to dampen jounce and rebound movement of the cab with respect to the truck frame.

Typically, air springs and shock absorbers have been connected directly to the longitudinal side beam members of the truck frame such that the forces transmitted to the cab were located at points remote from the cab center of gravity and consequently resulted in substantial rolling movements in cab sway. For example, U.S. Pat. No. 3,944,017, provides a suspension device for a truck cab having air springs with a low spring rate to isolate the vibration of the vehicle frame from the cab, but did not eliminate such rolling movement.

Further improved devices having combinations of air springs and shock absorbers positioned such that the vibration forces transmitted from the vehicle frame to the truck cab were substantially reduced, are also provided in U.S. Pat. Nos. 4,989,684 and 5,109,939.

SUMMARY OF THE INVENTION

The present invention provides a new and improved vibration dampening device for a vehicle which further reduces cab vibration and shock forces experienced by the vehicle driver. By reducing vibration and shock to the vehicle cab, the improved device also reduces both driver fatigue and structural damage to the vehicle cab. Although the present invention has been described in a preferred embodiment for use with a truck cab, the invention may readily be used in environments other than a truck cab in connection with isolation of a suspended body from the force vibrations of the support body.

The vibration dampening suspension device of the present invention for isolating a suspended body or truck cab from the force vibrations of a supporting body or vehicle frame, includes an impact plate and a support plate. The impact plate is a rigid body with a vertical axis and which is adapted for mounting to the truck cab and includes integral cross members extending in parallel relation from the impact plate in a direction toward the support plate. The support plate is a rigid body adapted for mounting to the vehicle frame, and includes an integral clevis formed by support members extending in parallel relation from the support plate in a direction toward the impact plate. A control torque arm having first and second ends is additionally provided in the preferred embodiment of the present invention. The first end of the arm is pivotally interconnected intermediate the cross members of the impact plate, and the second end of the arm is pivotally interconnected with the clevis formed by the support members.

The impact and support plates are interconnected by a lever member and a link member, each having first and second ends. The lever member includes a longitudinal axis. The first end of the link member is pivotally interconnected with the support plate at a support pivot, and the first end of the lever member is pivotally interconnected with the impact plate at a main pivot. The second end of the link member is pivotally interconnected with the lever member at a lever pivot positioned intermediate the first and second ends of the lever member, and along the lever member longitudinal axis.

A hydraulic shock absorber and air spring, each having first and second ends and central displacement axes, are also provided. The first end of the shock absorber is pivotally interconnected with the second end of the lever member at a shock pivot, and the second end of the shock absorber is pivotally interconnected with the impact plate at a pivot spaced from said main pivot. The air spring is engaged at its first and second ends with the impact and support plates, respectively, and positioned such that the displacement axis is inclined with respect to the impact plate vertical axis.

In the present invention, the main pivot and shock absorber second end pivot are secured to the cross members in a common plane parallel to and spaced from the suspended body. When the supporting body, suspended body and the preferred embodiment of the present invention are in a static condition, the shock absorber central axis and lever member longitudinal axis are aligned in parallel relationship in the same common plane. In this configuration, when the supporting body, suspended body and the preferred embodiment of the present invention are in a dynamic condition, the lever member rotates with respect to the main pivot during compression of the shock absorber, which correspondingly rotates the link member with respect to the lever pivot. As the suspended body or cab moves minimally up or down, as a result of disturbing frequencies applied to the vehicle frame, away from its position in the static condition, the shock absorber generates low resistance. Thus, for small relative displacements between the cab and frame, where the disturbing frequency of movement is high, low or no dampening resistance forces are generated or required. However, as the suspended body or cab continues to be moved a greater distance away from the static condition position, such as where the disturbing frequency of movement is lower and approaches a resonant frequency, the dampening or resistance forces of both the shock absorber and the link member increase. Specifically, the dampening resistance forces increase non-linearly as the frequency of such movement approaches the resonant frequency, where maximum forces are generated and desired. The configuration of the preferred embodiment of the present invention is thus able to better reduce undesirable vibration and shock forces transmitted from the supporting body or vehicle frame to the suspended body or truck cab, and thereby reduce driver fatigue and structural damage to the truck cab.

Other features and advantages of the present invention will become apparent from the following detailed description of the preferred embodiment made with reference to the accompanying drawings, which form a part of the specification.

DETAILED DESCRIPTION OF THE PREFERRED EMBODIMENT

Figure 1:
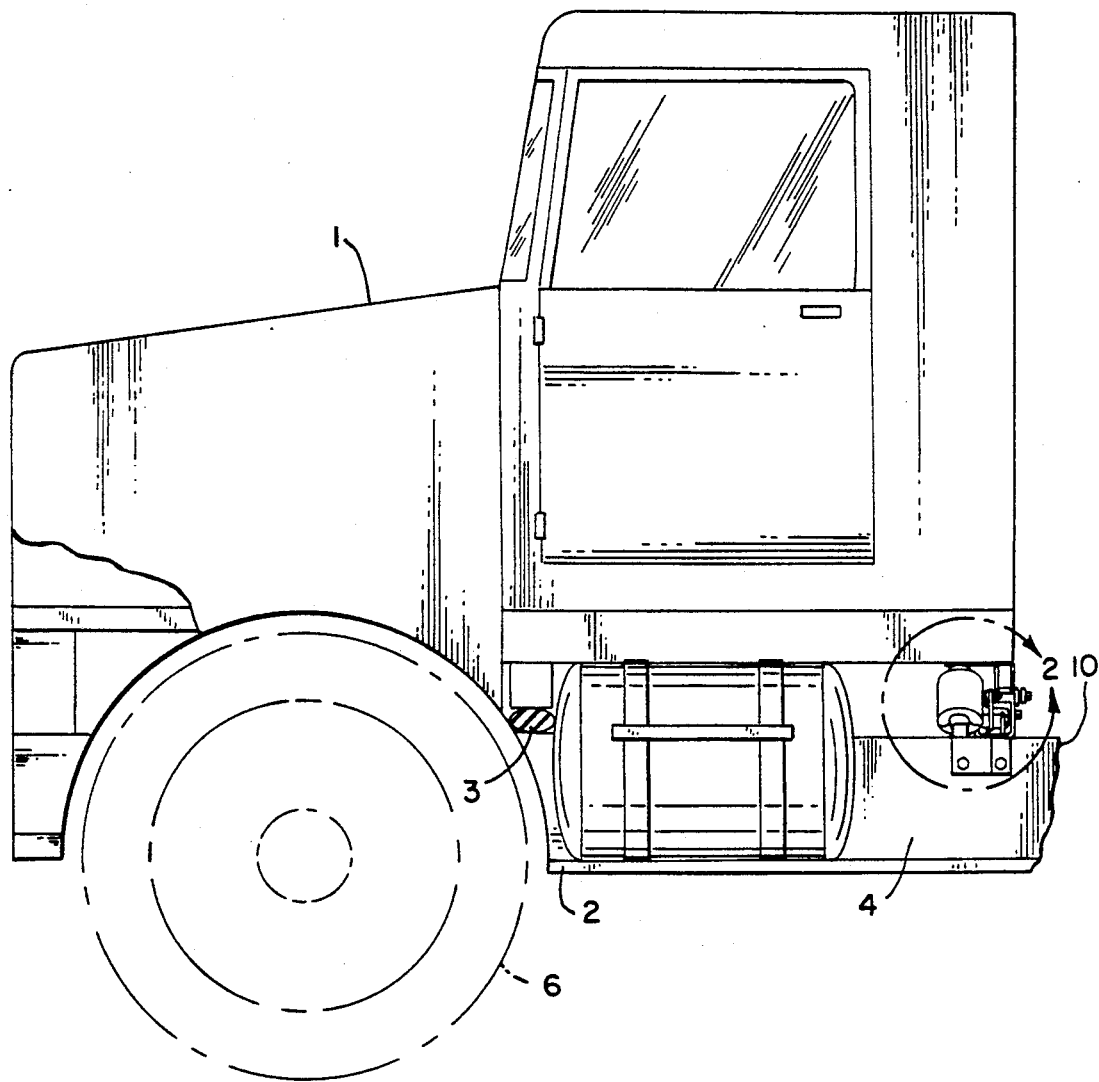
FIG. 1 is a side illustration of a truck vehicle and suspended cab according to the present invention.

FIG. 1 illustrates a side view of the truck cab 1 mounted to the truck frame 2. There are numerous methods for mounting the forward portion of a truck cab to the frame. For the purpose of illustrating the present invention, the forward portion of the cab ; is connected to the frame 2 by interposing between the cab and the frame in elastomeric rubber donut 3 which serves to dampen the vibration and shock transmitted to the cab. The rubber donut 3 or mount secures the forward structure of the cab to the truck frame 2 utilizing a design which provides some dampening of vibration transmitted from the frame to the cab. It also provides rotational flexibility allowing the cab structure to pivotally rotate about the rubber donut thereby allowing uninhibited cab isolation. The connection of the forward portion of the truck cab 1 to the truck frame 2 utilizes standard fastening methods which are common in the vehicle industry. The rear of the truck cab 1 is suspended from the truck frame 2 by the improved vibration dampening suspension device of the present invention which is more particularly shown in FIG. 2.

Figure 2:
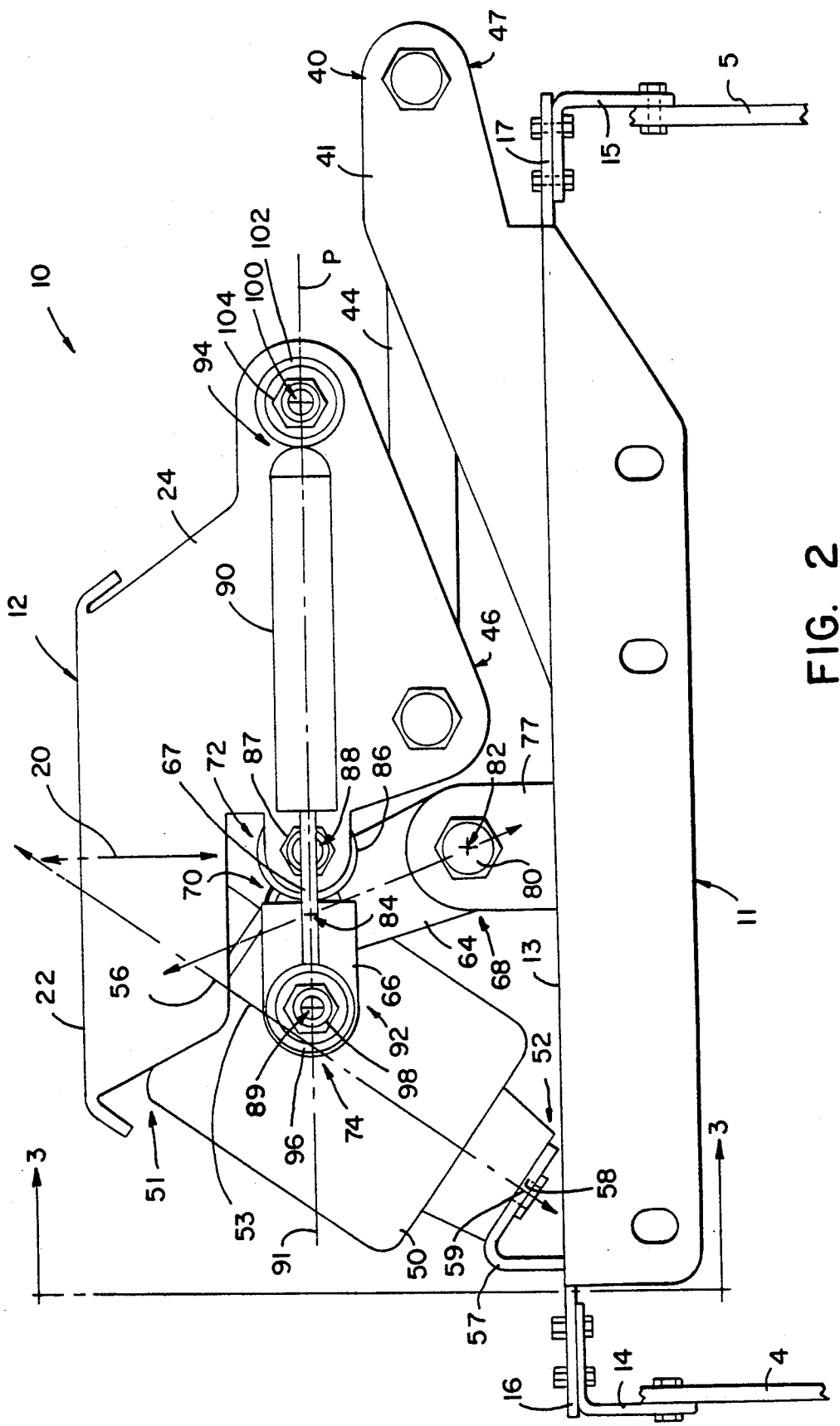
FIG. 2 is a view of the present invention in static condition position from the rear of the suspended cab.
Figure 8:
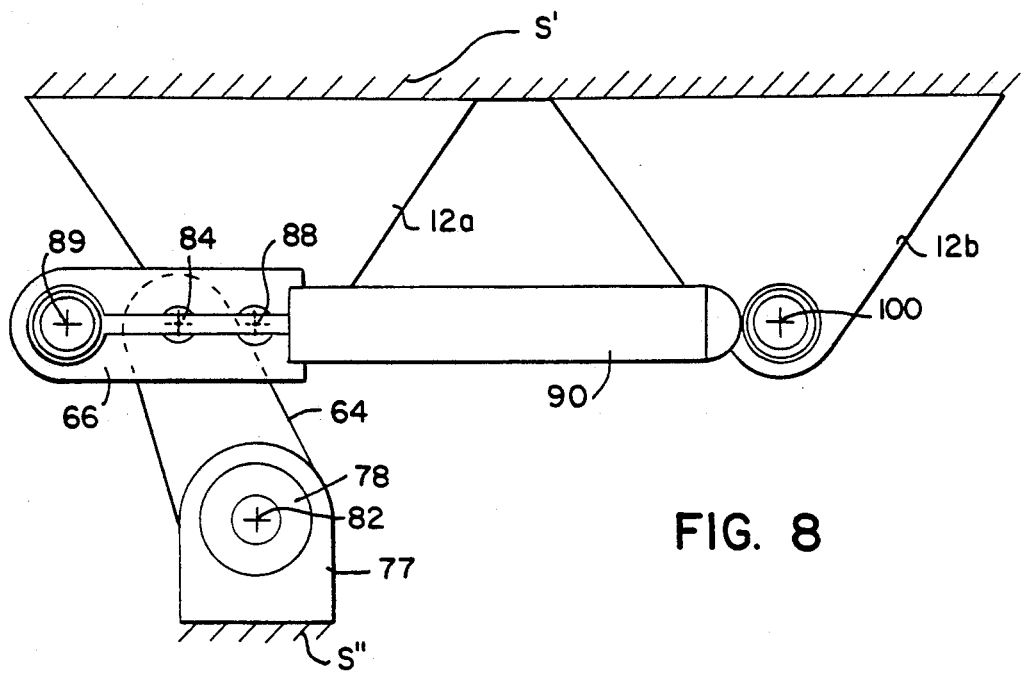
FIG. 8 is a schematic representation of the device of the present invention in static condition.
Figure 9:
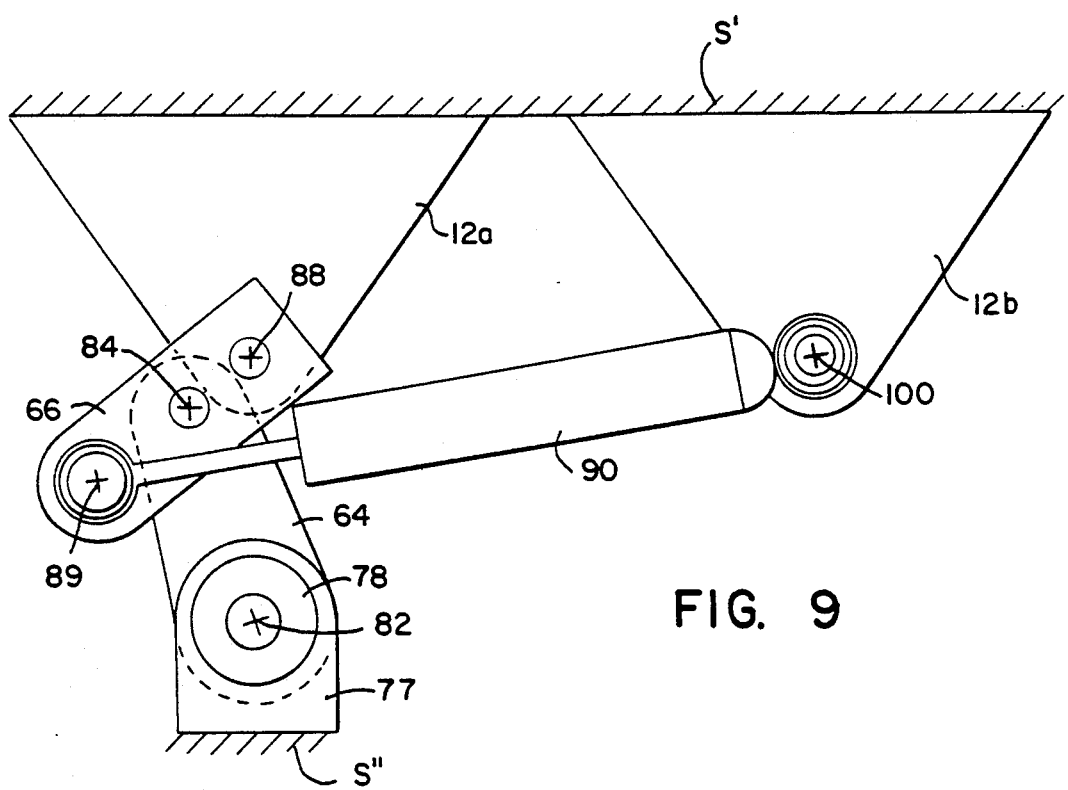
FIG. 9 is a schematic representation of the device of the present invention in dynamic condition.

As shown in FIG. 2, which is a rear view of the vibration dampening device 10, a support plate 11 and impact plate 12 are provided. Support plate 11 is bolted by conventional fasteners to a side beam 4 and a side beam 5 of the truck frame 2. Support plate 11 is a rigid member formed from sheet metal for attachment to the truck frame 2, and having a base portion 13 with ends forming rear cab bracket mounts 16 and 17, which are rigidly secured to angle brackets 14 and 15, which are in turn bolted to the truck frame. Thus, support plate 11 forms a rigid platform interconnecting side beams 4 and 5 of the truck frame 2 such that the shock and vibration forces experienced by the truck frame are transmitted directly to the support plate 11. However, it should be understood that the device 10 of the present invention is not limited to a particular attachment location, orientation, or part dimensions. The support plate 11 may be attached to either the suspended body or support body, and the impact plate 12 attached to the other of the suspended body or support body. Likewise, the orientation of the plates 11, 12 with respect to the suspended and supporting bodies may be in any direction, and is not limited to the particular orientation of the illustrated device 10. Schematic representations of the device of the present invention are illustrated in FIGS. 8 and 9, with the impact plate 12, shown as comprising two portions 12a, 12b, both of which are attached to either a suspended body or supporting body S', while the support plate is attached to the other of the suspended body or supporting body S".

Figure 3:
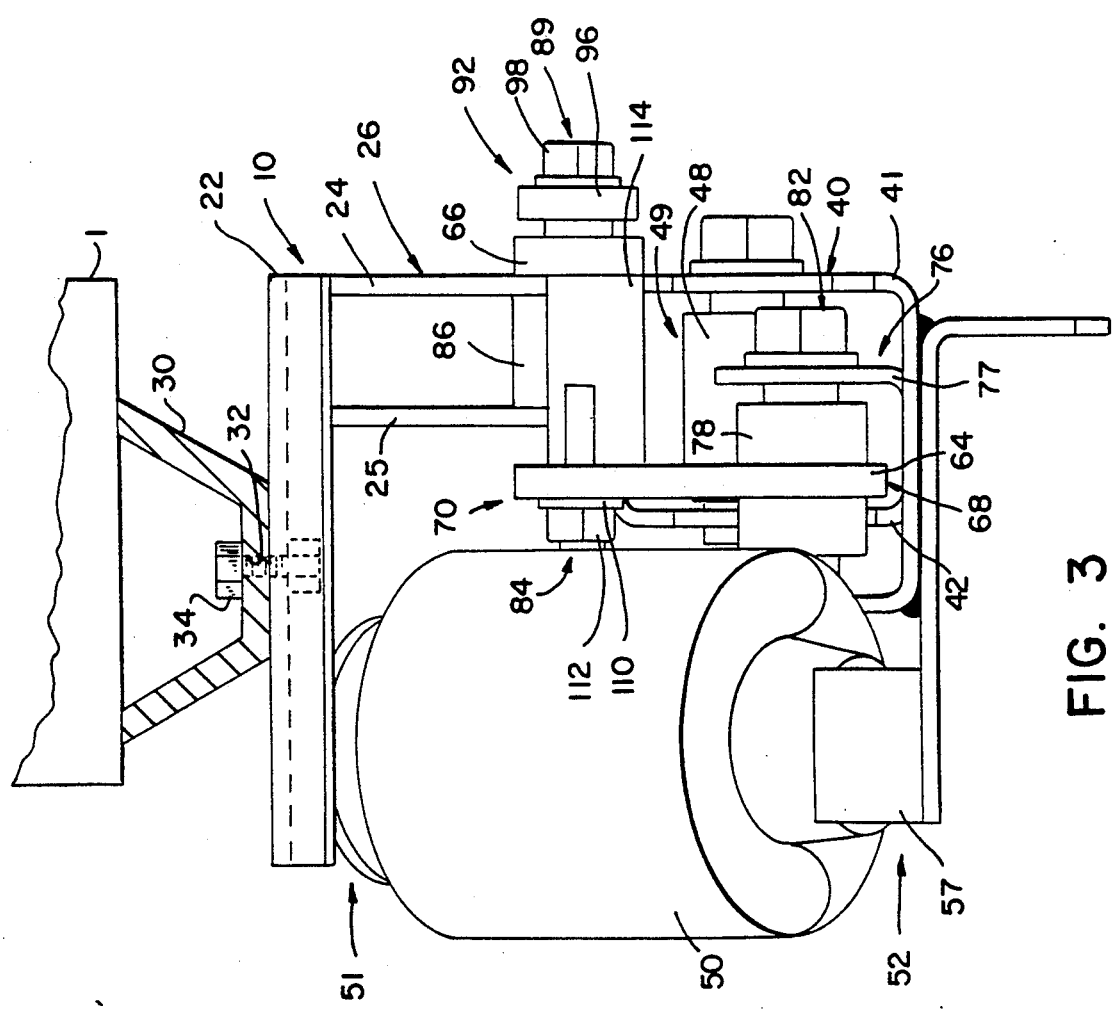
FIG. 3 is an end view of the present invention taken along the line 3—3 in FIG. 2.

FIG. 3 illustrates a typical connection of the impact plate 12 to the cab 1. A V-shaped channel member 30 supports the base of the truck cab 1 and is secured to impact plate 12 through an opening 32 by conventional fasteners 34. The impact plate 12 is a rigid member formed of sheet metal having a vertical axis 20, and a base portion 22 which engages the truck cab 1. Cross members 24, 25 are provided which form a clevis 26. In the illustrated embodiment the cross members are integral with the impact plate 12, extend in parallel relationship from the impact plate toward the support plate 11.

The support plate 11 includes a clevis 40 which may be secured to, or formed integrally with, the support plate. The clevis 40 is formed by support members 41, 42 extending in parallel relationship from the support plate 11 toward the impact plate 12. As shown in FIG. 2, a torque control arm 44 is secured between the cross members 24, 25 forming the clevis 26 of the impact plate 12 and clevis 40 of the support plate 11. The torque arm 44 has first and second ends 46, 47. The first end 46 has a rubber bushing 48 secured thereto, and which is positioned intermediate the cross members 24, 25 of the clevis 26. A conventional fastener is secured through openings in the rubber bushing 48 and cross members 24, 25 to provide a pivotal interconnection between the torque arm 44 and impact plate 12 at the pivot 120. The second end 47 of the torque arm is also provided with a rubber bushing 49, which is positioned intermediate the clevis 40 and secured by a conventional fastener through openings in the support members 41, 42 and bushing 49 to provide a pivotal interconnection between the torque arm 44 and support plate 11 at a pivot 122. The rubber bushings 48, 49 referred to in the preferred embodiment are manufactured by Mullins Rubber Company and identified by part no. 116-178A, and are typically welded to the ends of the torque arm.

Figure 4:
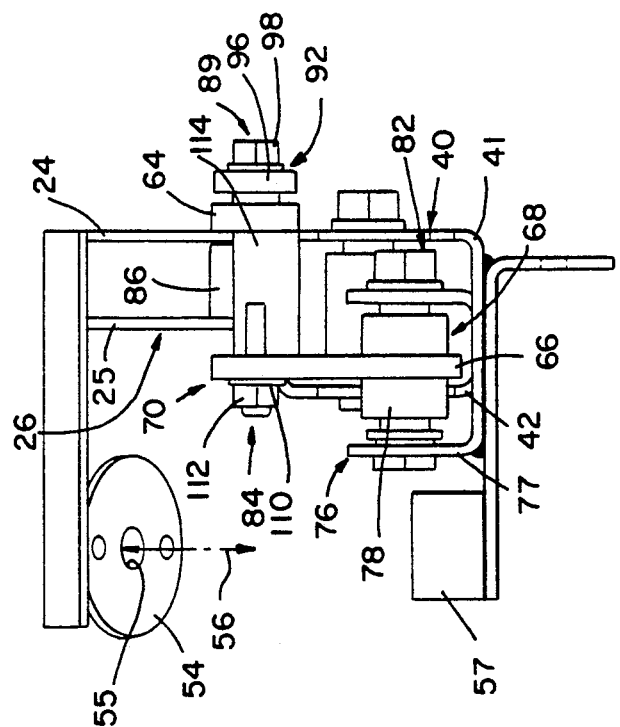
FIG. 4 is an end view of portions of the present invention.

Also interposed between the impact plate 12 and support plate 11 is an air spring 50, which in the preferred embodiment of the invention is manufactured by Goodyear Tire & Rubber Company and is identified by the trademark "Super-Cushion." As shown in FIG. 2, the air spring 50 includes a top end 51, a bottom end 52, and a displacement axis 53. The top end 51 is secured by conventional fasteners to a disk plate 54 which extends from the base portion 22 of the impact plate 12, as shown in FIG. 4. The disk plate 54 having an opening 55 with a central axis 56, which is at an angle transverse with respect to the vertical axis 20 of the impact plate, which is preferably 35 degrees. The lower end 52 of the air spring 50 is secured to the support plate 11 on a bracket plate 57. The bracket plate has an opening 58 with a central axis 59 which is aligned with the central axis 56 of the disk plate. When the air spring 50 is mounted on the disk plate 54 and bracket plate 57 of the present invention, the displacement axis 53 of the air spring is aligned and coincides with the central axes 56, 59 of the disk and bracket plates 54, 57. It should be understood to one of ordinary skill in the art that the air spring 50 and torque arm 44 are included in the illustrated embodiment to obtain improved performance, but are not required for successful operation of the device 10.

Figure 5:
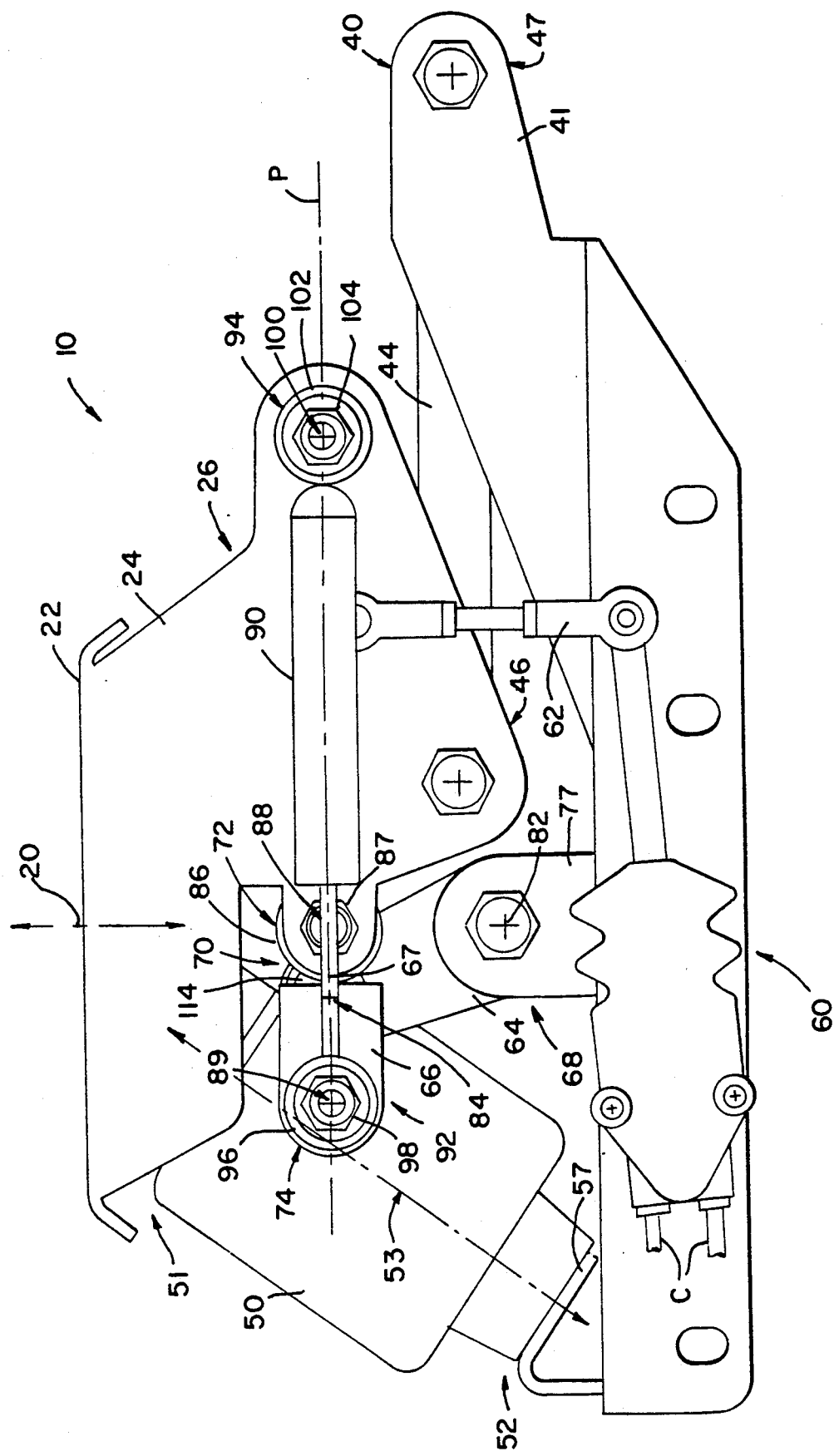
FIG. 5 is a rear view of the present invention in static condition position, and including a height control valve.

As shown in FIG. 5, a height control valve 60 is also mounted to the support plate 11 for maintaining the air spring 50 at a constant height regardless of the vertical forces experienced by the vehicle frame 2 and truck cab 1. The height control valve 60 includes a control rod 62 which is secured to a cross member 24 of the impact plate 12, and detects height changes of the air spring 50. The height changes are relayed via connections C to the height control valve 60 which either admits or exhausts air from the spring in order to maintain a constant height, preferably 7 inches. The air spring used in the present invention may be set to operate between preselected heights of 6.2 inches to 7.2 inches. Any standard height control valve may be utilized with the air spring. The height control valve 60, which in the preferred embodiment of the present invention is manufactured by Rockwell WABCO, part no. 4640070040, may be used with any conventional air spring.

The impact and support plates 12, 11 are further interconnected by a link member 64, a lever member 66, and a hydraulic shock absorber 90, each having first and second ends 68, 70, 72 74, and 92, 94, respectively. The shock absorber 90 has a central displacement axis 91. The link member is a rigid metal member pivotally interconnected with a link clevis 76 at its first end 68. The link clevis is formed by a metal U-shaped bracket 77 which is welded to the support plate 11. A link rubber bushing 78, of the type previously described, is welded to the first end 68 of the link member 64. The link bushing and link member are positioned such that openings formed in each of the link bushing, link member and clevis are aligned, and a conventional fastener 80 is secured through the aligned openings to pivotally interconnect the link with the clevis at a support pivot 82. The second end 70 of the link member 64 is pivotally interconnected with the lever member 66 at a lever pivot 84. The preferred distance between the support pivot 82 and the lever pivot is 2.75 inches.

The lever member 66 has a longitudinal axis 67, is formed by a rigid metal member, and is pivotally interconnected at its first end 72 to the cross members 24, 25 of the clevis 26 of the impact plate 12. Specifically, the lever member first end is welded to a bearing member 86 which is secured by conventional fasteners 87 intermediate the cross members 24, 25 of the clevis 26, and forms a pivotal interconnection between the lever member and impact plate at a main pivot 88.

Spaced from the main pivot 88 along the lever member longitudinal axis 67, the lever pivot 84 pivotally interconnects the lever member 66 and the link member 64. The link member second end 70 has a conventional pivot tube 110 engaged through an opening formed in the link member, and a conventional fastener 112 within the pivot tube. The conventional fastener or bolt 112 is welded to a bearing 114, which is also engaged with the lever member 66 intermediate the main pivot and shaft pivot, to form the pivotal interconnection at the lever pivot 84. The distance between the main pivot 88 and the lever pivot 84 is preferably 1 inch. The bearings provided in the preferred embodiment of the present invention are manufactured by SKF company, part no. 1616DC.

The second end 74 of the lever member 66 is pivotally interconnected with the first end 92 of the shock absorber 90 at a shock pivot 89. The shock pivot 89 is formed by a bearing 96 which is welded to the first end 92 or piston end of the shock absorber. A conventional fastener 98 is engaged through the bearing and an aligned opening in the lever member 66 for pivotal interconnection. The distance between the shock pivot 89 and the main pivot 88 is preferably 2.5 inches.

The second end 94 of the shock absorber 90 is pivotally interconnected with the cross members 24, 25 of the clevis 26 at a pivot 100 spaced from the main pivot 88. In the illustrated embodiment, the distance between the shock pivot 89 and the pivot 100 is preferably 9.5 inches. It should be understood that the effective shock stroke length may be sufficient to enable travel of said lever member 66 such that the longitudinal axis 67 of the lever member is rotated as far a 90 degrees in either direction with respect to the position of the axis 67 at static position. With the desired stroke length, the lever member 66 is permitted to travel to obtain the desired or maximum resistive force benefit, but is prevented from toggling over a desired stop location or 90 degrees in either direction. With this configuration the shock absorber alone may be used to limit the maximum rotation of the lever in either direction. Alternatively, an additional stop mechanism (not illustrated) may also be used in conjunction with the shock absorber to limit such movement.

The spaced pivot 100 is formed by a bearing 102 which is welded to the second end 94 or cylinder end of the shock absorber. A conventional fastener 104 is engaged through the bearing and aligned openings formed in the cross members 24, 25 of the clevis 26 for pivotal interconnection.

Figure 6:
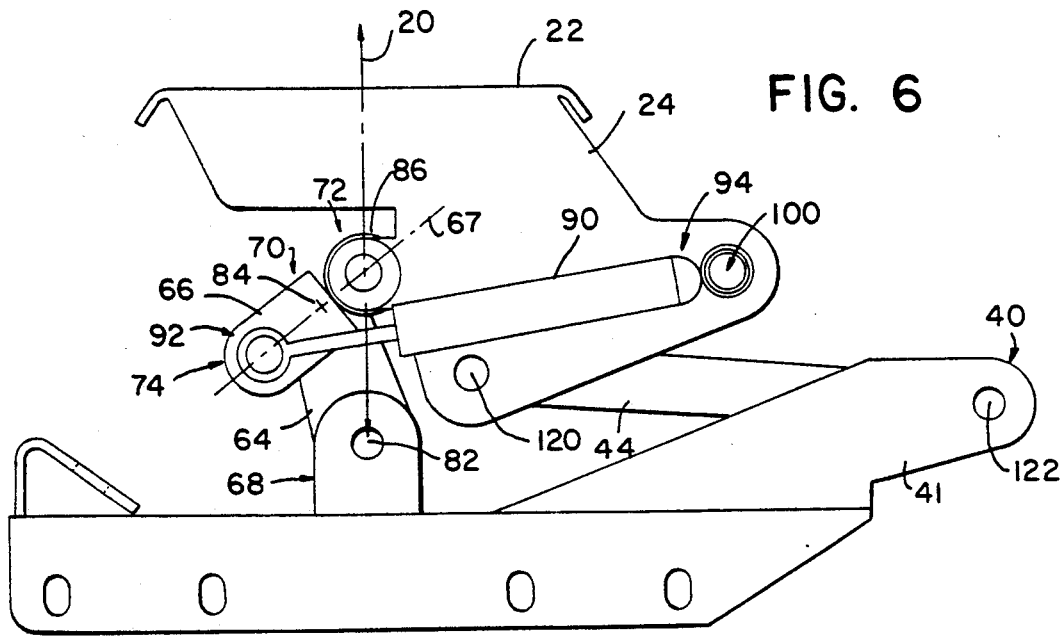
FIG. 6 is a rear view of a portion of the present invention in compressed dynamic condition position, with the shock absorber in compressed condition.
Figure 7:
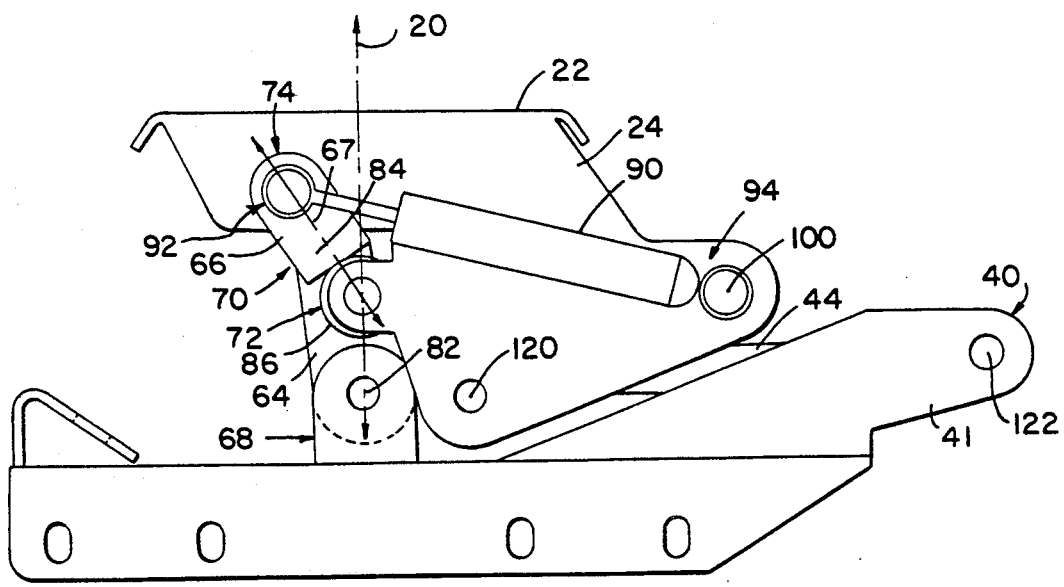
FIG. 7 is a rear view of a portion of the present invention in extension dynamic condition position, with the shock absorber in compressed condition.

As illustrated in FIGS. 2 and 5, the main pivot 88 and shock absorber second end pivot 100 are secured to the cross members 24, 25 forming the clevis 26 in a common plane P which is parallel to and spaced from the cab 1 or suspended body, when the device 10 is in a static condition position. The distance between the main pivot 88 and the shock absorber second end pivot 100, as illustrated, is preferably 7 inches. When the truck frame 2 or supporting body, the cab or suspended body and the preferred embodiment of the present invention are in static condition, the shock absorber central axis 91 and the lever member longitudinal axis 67 are aligned in parallel relationship in the same common plane P. In this configuration, when the truck frame, cab and the present invention 10 are in a dynamic condition, the lever member 66 rotates with respect to the main pivot 88 during compression of the shock absorber, which correspondingly rotates the link member 64 with respect to the lever pivot 84, as shown in FIGS. 6 and 7.

In operation, the passage of truck wheels 5 over a highway will cause the transmission of shock and vibration forces from the truck frame 2 to the support plate 11. The device 10 is positioned intermediate the side beams 4 and 5 of the truck frame, such that the vertical axis 20 of the impact plate 12 is at the center of the cab 1. In this position, the forces transmitted from the truck frame 2 to the truck cab 1 are directed toward the device 10 at the center of gravity of the cab. As the suspended body or cab 1 moves minimally up or down, as a result of disturbing frequencies applied to the vehicle frame, the shock absorber 90 has a low resistance force. For minimal changes in the distance between the cab 1 and frame 2, where the frequency of movement is high, low or no dampening resistance forces are generated or required. However, as the suspended body or cab 1 continues to be moved a greater distance away from the static condition position, and the movement frequency is lower and approaches a resonant frequency, the dampening or resistance forces of both the shock absorber 90 and the link member 64 are increased. The increase in resistance forces results from changes in the link member 64, lever member 66 and shock absorber.

The shock absorber 90 increase in resistance force results from the increase in relative velocity across the shock absorber. The lever member 66 resistance increase is due to the increased torque applied by the shock absorber 90, which consequently results in increased torque to the link member 64 and an equal resistance increase in the link member. FIG. 6 illustrates compression of the device 10 of the present invention where the shock absorber is compressed from a preferred length of 9.5 inches at static condition, to 9.099 inches. FIG. 7 illustrates extension of the device 10 where the shock absorber is compressed from 9.5 inches to 8.649 inches. It will be understood by one of ordinary skill in the art that the shock absorber can be valved for the desired level of force absorption or resistance, for example, a high resistance when the impact plate is moving away from the static position, and low resistance when the impact plate is moving toward the static position.

In the geometric configuration of the present invention, shown schematically in FIGS. 8 and 9, the dampening resistance forces increase non-linearly as the frequency of movement approaches the resonant frequency, where maximum forces are generated and desired. Using this configuration in the device 10 of the present invention, undesirable vibration and shock forces transmitted from the supporting body or vehicle frame to the suspended body or truck cab are reduced, as are driver fatigue and structural damage to the truck cab.

The preferred form of the present invention has been described above. However, with the present disclosure in mind it is believed that obvious alterations to the preferred embodiment, to achieve comparable features and advantages in other assemblies within the scope and spirit of the following claims, will become apparent to those of ordinary skill in the art.

We claim:

1. A vibration dampening suspension device for isolating a suspended body from the force vibrations of a supporting body, comprising:
    a) an impact plate adapted for mounting to said suspended body or supporting body and having a vertical axis;
    b) a support plate adapted for mounting to the other of said suspended body or supporting body;
    c) a link member having first and second ends, said first end pivotally interconnected with said support plate at a support pivot;
    d) a lever member having a longitudinal axis and first and second ends, said first end pivotally interconnected with said impact plate at a main pivot;
    e) a hydraulic shock absorber having a central axis and first and second ends, where said first end is pivotally interconnected with said lever member second end at a shock pivot and said second end is pivotally interconnected with said impact plate at a pivot spaced from said main pivot; and
    f) wherein said second end of said link member is pivotally interconnected with said lever member at a lever pivot positioned intermediate said first and second ends of said lever member and intermediate said shock pivot and main pivot for rotation of said lever member with respect to said main pivot.

2. A vibration dampening suspension device of the type recited in claim 1, wherein said shock absorber central axis and said lever member longitudinal axis are parallel when the supporting body, suspended body and device are in a static condition.

3. A vibration dampening suspension device of the type recited in claim 2, wherein said lever pivot is on said lever member longitudinal axis.

4. A vibration dampening suspension device of the type recited in claim 3, wherein said impact plate includes a cross member extending from said impact plate in a direction toward said support plate, and said main pivot and said pivot spaced from said main pivot interconnecting said shock absorber second end, are interconnected with said cross member.

5. A vibration dampening suspension device of the type recited in claim 4, wherein said main pivot and said shock absorber second end pivot are in a common plane of said cross member spaced from the impact plate, and said shock absorber central axis and said lever member longitudinal axis are in said plane in the static condition.

6. A vibration dampening suspension device of the type recited in claims 1 or 5, further comprising an air spring having a displacement axis and first and second ends, and said first and second ends are interconnected with said impact and support plates, respectively.

7. A vibration dampening suspension device of the type recited in claim 6, wherein said air spring displacement axis is transverse with respect to said impact plate vertical axis.

8. A vibration dampening suspension device of the type recited in claim 7, wherein said air spring displacement axis is inclined with respect to said impact plate vertical axis.

9. A vibration dampening suspension device for isolating a suspended body from the force vibrations of a supporting body, comprising:
    a) an impact plate adapted for mounting to said suspended body and having a vertical axis;
    b) a support plate adapted for mounting to said supporting body;
    c) a link member having first and second ends, said first end pivotally interconnected with said support plate at a support pivot;
    d) a lever member having a longitudinal axis and first and second ends, said first end pivotally interconnected, with said impact plate at a main pivot;
    e) a hydraulic shock absorber having a central axis and first and second ends, where said first end is pivotally interconnected with said lever member second end at a shock pivot and said second end is pivotally interconnected with said impact plate at a pivot spaced from said main pivot;
    f) a torque arm having first and second ends, said first end pivotally interconnected with said impact plate and said second end pivotally interconnected with said support plate; and
    g) wherein said second end of said link member is pivotally interconnected with said lever member at a lever pivot positioned intermediate said first and second ends of said lever member and intermediate said shock pivot and main pivot for rotation of said lever member with respect to said main pivot.

10. A vibration dampening suspension device of the type recited in claim 9 wherein said impact plate includes a cross member extending from said impact plate in a direction toward said supporting body, and said main pivot, said pivot spaced from said main pivot interconnecting said shock absorber second end, and said torque arm, are interconnected with said cross member.

11. A vibration dampening suspension device of the type recited in claim 10, further comprising an air spring having a displacement axis and first and second ends, and said first and second ends are interconnected with said impact and support plates, respectively, and said air spring displacement axis is transverse with respect to said impact plate vertical axis.

12. A vibration dampening suspension device of the type recited in claim 11, wherein said air spring displacement axis is inclined with respect to said impact plate vertical axis.

13. A vibration dampening suspension device for isolating a suspended body from the force vibrations of a supporting body, comprising:
   a) an impact plate adapted for mounting to said suspended body and having a vertical axis;
   b) a support plate adapted for mounting to said supporting body;
   c) a link member having first and second ends, said first end pivotally interconnected with said support plate at a support pivot;
   d) a lever member having a central axis and first and second ends, said first end pivotally interconnected with said impact plate at a main pivot;
   e) a hydraulic shock absorber having a central axis and first and second ends, where said first end is pivotally interconnected with said lever member second end at a shock pivot and said second end is pivotally interconnected with said impact plate at a pivot spaced from said main pivot;
   f) an air spring having a displacement axis transverse with respect to said impact plate vertical axis, and first and second ends interconnected with said impact and support plates, respectively;
   g) a torque arm having first and second ends, said first end pivotally interconnected with said impact plate and said second end pivotally interconnected with said support plate; and
   h) wherein said second end of said link member is pivotally interconnected with said lever member at a lever pivot positioned intermediate said first and second ends of said lever member and intermediate said shock pivot and main pivot for rotation of said lever member with respect to said main pivot during compression of said shock absorber when said supporting body, suspended body and device are in a dynamic condition.

14. A vibration dampen suspension device of the type recited in claim 13, wherein said impact plate includes a cross member extending from said impact plate in a direction toward said supporting body, and said main pivot, said pivot spaced from said main pivot interconnecting said shock absorber second end, and said torque arm, are interconnected with said cross member.

15. A vibration dampening suspension device of the type recited in claim 14, wherein said air spring displacement axis is inclined with respect to said impact plate vertical axis.

16. A vibration dampening suspension device of the type recited in claim 15, wherein said shock absorber central axis and said lever member longitudinal axis are parallel when the supporting body, suspended body and device are in a static condition.

17. A vibration dampening suspension device of the type recited in claim 16, wherein said lever pivot is on said lever member longitudinal axis.

18. A vibration dampening suspension device of the type recited in claim 17, wherein said impact plate includes a cross member extending from said impact plate in a direction toward said supporting body, and said main pivot and said pivot spaced from said main pivot interconnecting said shock absorber second end, are interconnected with said cross member.

19. A vibration dampening suspension device of the type recited in claim 19, wherein said main pivot and said shock absorber second end pivot are in a common plane of said cross member spaced from the suspended body, and said shock absorber central axis and said lever member longitudinal axis are in said plane in the static condition.

* * * * *